Patented Mar. 25, 1924.

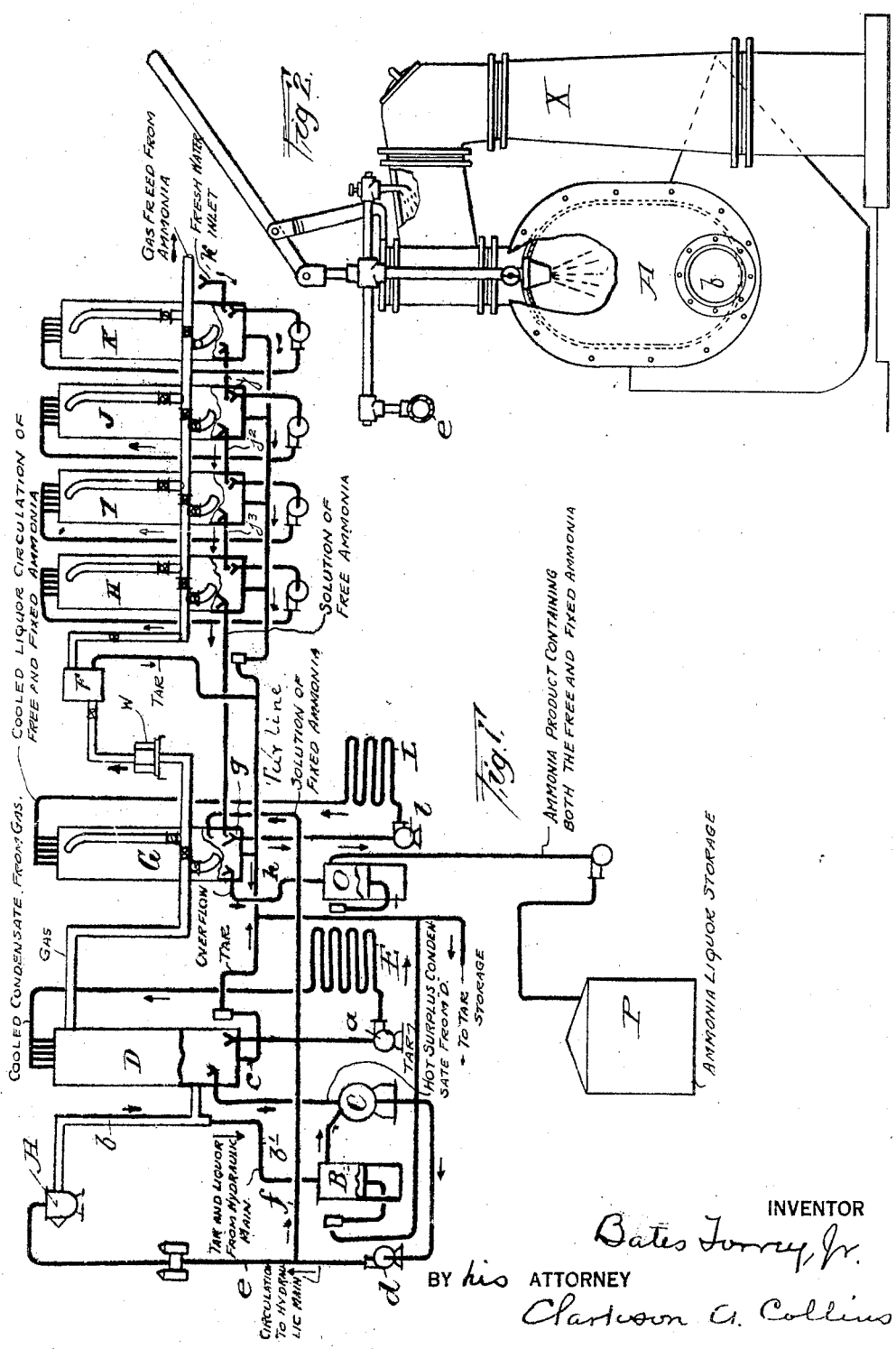

1,487,768

UNITED STATES PATENT OFFICE.

BATES TORREY, JR., OF SYRACUSE, NEW YORK, ASSIGNOR TO SEMET-SOLVAY COMPANY, OF SOLVAY, NEW YORK, A CORPORATION OF NEW YORK.

PROCESS OF AND APPARATUS FOR RECOVERING THE AMMONIA CONTENT OF COAL GAS.

Application filed November 10, 1922. Serial No. 600,032.

*To all whom it may concern:*

Be it known that I, BATES TORREY, Jr., a citizen of the United States, residing at Syracuse, in the county of Onondaga and State of New York, have invented a new and Improved Process of and Apparatus for Recovering the Ammonia Content of Coal Gas, of which the following is a specification.

My invention relates particularly to the treatment of the gas produced by the destructive distillation of coal to the end of recovering its ammonia content, (both that present in the forms of so-called fixed and free ammonia,) in the form of solution or ammoniacal liquor. The fixed ammonia is represented by such compounds as choride and sulphate of ammonia, while the free ammonia includes the carbonate, sulphide and cyanide.

From such liquor the ammonia is subsequently recovered in commercial form and one object of my improvements is to obtain a liquor of relatively high ammonia concentration or small volume to the end of economy in the subsequent recovery and utilization of its ammonia content.

This object I accomplish by obtaining at a single point in the recovery system a finished liquor which contains both all the fixed and all the free ammonia recovered from the gas this point being that point of the system where is found the best combination of low temperature and high ammonia gas concentration, for effecting ammonia absorption, that is to say, for obtaining a finished liquor of maximum ammonia content or minimum volume.

In carrying my invention into effect, the water content of the coal which is carried into the hydraulic or gas collecting main as vapor with the gas, is after condensation returned to this part of the system and used to spray the gas in the main whereby tar is removed, the gas cooled and the major portion of the so-called fixed ammonia absorbed. The resulting liquor, after being freed of a substantial portion of its tar content is continuously re-circulated and returned to the main in the form of spray wherewith the gas is washed so that a solution relatively concentrated in fixed ammonia is formed.

From this solution, liquor is then drawn off at a rate substantially corresponding to the quantity of water being introduced into the main by and condensed from the gas produced by the destructive distillation of the coal so that a uniform quantity of water is maintained in the main.

Further, this fixed ammonia liquor drawn off from the main and the weak ammonia liquor from the final ammonia scrubbers is used for the final cooling of the gas, by bringing the same in contact therewith after cooling. Thus the absorptive power of the fixed ammonia liquor and of the weak ammonia liquor for free ammonia, is further utilized, and this cooling liquor circulation not only cools the gas and removes tar therefrom but also removes a large portion of the free ammonia.

In this manner the quantity of fresh water required in the recovery of the ammonia content of the gas is kept at a minimum and a highly concentrated solution of ammonia is obtained.

The invention will be best understood by reference to the accompanying drawings, Fig. 1 of which illustrates in diagrammatic form an organization of apparatus which may be used in carrying the invention into effect. Fig. 2 is a view on an enlarged scale, partly in section, of means for spraying the gas in the hydraulic main, reference being made thereto by the letters of reference indicating the several parts.

Referring to the drawings, A, indicates a hydraulic or gas collecting main in which the gas from the coal is received as it comes from the retorts (not shown in the drawings), through pipes X.

In this the gas is sprayed with water by well known means, a form of which is shown in Fig. 2. This spraying operation removes much of the tar from the gas and at the same time, the temperature of the gas is reduced. A portion of the water so used in spraying the gas is carried by the gas in the form of vapor and another portion remains in the main in liquid form mixed with the tar precipitated from the gas and this liquor contains most of the fixed ammonia originally present in the gas.

The water in the main, together with the tar, is drawn off as through a pipe, *b*, to a settling tank B where the tar settles out and is drawn off to a tar collecting tank (not shown) while the water overflows to a collecting tank C.

The gas from the main passes first to a cooling tower D wherein it is showered with cooled water of condensation from the gas, this being drawn from the bottom of the tower D and continuously forced as by pump $a$ through cooling coils E which are showered with cold water and thence to the top of the cooler D. By this contact with water, the gas is cooled to a temperature of about 40° C., a large proportion of its residual tar content is removed and much of the water vapor carried thereby is condensed. The precipitated tar settles to the bottom of the cooler and is drawn off as by pipes $c$ to the tar collector. The hot surplus water of condensation is drawn off to the collecting tank C where it is mixed with the overflow from tank, B, whence the mixture is continuously returned as by pump, $d$, and pipe, $e$, to the main where the gas is sprayed therewith. Thus the cooler D with the gas main and the connecting pipes form a closed circulating system in which water of condensation from the gas is continuously re-circulated to the main and used to spray the gas therein and wherein a major portion of the tar and fixed ammonia is removed from the gas. The excess liquor from this system is drawn off as by pipe, $f$, which is connected with the circulation system at a point, where the solution is relatively free from tar, and this solution, which contains a large proportion of the fixed ammonia of the gas, is subsequently mixed with the solution of free ammonia obtained from the gas at a later stage. The rate of draw-off corresponds to the amount of water introduced into this circulating system by and condensed from the gas entering the system through pipes X, that is, to the water content of the coal, so that a substantially constant volume of liquid is maintained in the hydraulic main circulation.

Normally the amount of water so imported into this system will be sufficient to prevent excessive concentration of the fixed ammonia. In case of an abnormally low water content in the coal, or for example, if a weaker fixed ammonia liquor is desired or greater cooling in the main, it may be advisable to add some fresh water to the circulating system, for example, at tank C but otherwise the only water in this system is that derived from the coal so that the volume of solution of fixed ammonia is kept at a minimum.

The gas is then finally cooled by washing in a second cooling tower, G, as hereinafter explained and the gas so washed and cooled in the tower, G, is forced, as by exhauster, W, through a tar extractor, F, of any usual or suitable construction.

Finally the gas is passed through a series of scrubbers H, I, J and K in which the final removal of the free ammonia from the gas is effected.

As shown in Fig. 1, each of these scrubbers has an individual closed circulating system, the liquor being continuously removed from the bottom of the scrubber, which serves as a reservoir, and pumped to the top where it is again distributed into the tower. A small amount of fresh water is introduced at, $k$, into the circulation of the final scrubber, K, where the final removal of ammonia from the gas is effected. The overflow liquor from K which corresponds to the amount of fresh water introduced at, $k$, enters in turn the circulation of scrubber, J, at $j$, and there are similar connections $j^2$, $j^3$ between scrubbers, J, and I, and, I, and, H.

The overflow liquor from, scrubber H, now charged with free ammonia, and the solution of fixed ammonia drawn off from the hydraulic main through the pipe line, $f$, are introduced in a similar manner at, $g$, into the circulating liquor of the second gas cooling tower, G, before the passage of this liquor through the cooling coils, L. The temperature of the gas is here reduced to from 20-25° C. and at the same time a large proportion of its free ammonia is removed, so that the complete and final removal of the free ammonia in the succeeding scrubbers, H, I, J, and, K, is readily effected by the use of a relatively small quantity of fresh water and by a relatively small number of scrubbers.

By this means the absorptive capacity of both the fixed ammonia solution from the main and of the free ammonia solution from the scrubbers, H, I, J, and K, for free ammonia is again utilized and this utilization takes place where there is found the optimum combination of low temperature and high ammonia gas content for effective ammonia absorption.

The overflow from cooling tower, G, contains now not only all the ammonia, both free and fixed, recovered from the gas but is also of maximum ammonia concentration. This overflow which is the finished product of the process passes as by pipe, $h$, to a decanter, O, where any remaining tar is allowed to settle out and thence by overflow to an ammonia liquor storage tank P.

It is of course obvious that the relative position of exhauster, W, tar extractor, F, and second cooler, G, may be changed with respect to each other depending on the optimum operating temperatures for the exhauster and for the tar extractor.

The fixed ammonia liquor from the hydraulic main may also under certain operating conditions of temperature and ammonia concentration be introduced into the ammonia scrubbers instead of directly into the cooler, G, although I prefer the latter.

Obviously, for maximum recovery this fixed ammonia liquor should in no case be introduced into the last ammonia scrubber, K.

It is thus seen that by my process all the finished product is obtained at one point in the system. That this finished product contains substantially all the ammonia of the gas both fixed and free and that it is of maximum concentration or minimum volume. The cost, therefore, (power, apparatus, heat, etc.) of subsequent handling or working up of this product for concentrated aqua ammonia or any other market product will be less than heretofore.

It will be noted further that in achieving this, the object of my invention, the following steps are taken and intermediate results obtained.

1. All the condensate from the primary cooler is used as make-up water for the hydraulic main, thus supplying all the liquid needed or reducing any fresh water addition to a minimum.

2. A product is obtained from the hydraulic main which is a relatively concentrated solution of fixed ammonia.

3. This fixed ammonia solution is in turn used to further cool and wash the gas and as an absorbing medium for free ammonia.

4. All the ammonia liquors of the system are combined and brought into final contact with the gas at that point in the system where the conditions of low temperature and high ammonia gas concentration are most favorable for ammonia absorption.

5. The load on the ammonia scrubbers is thus reduced effecting a reduction in their number and in the volume of fresh water used.

Having thus described my invention what I claim as new and desire to secure by Letters Patent is:—

1. The process of recovering ammonia from coal gas which consists in forming a fixed ammonia liquor by withdrawing liquor from the gas collecting main and continuously returning it to the main and spraying the gas in the main therewith, completing the removal of free ammonia from the gas by scrubbing the gas with fresh water and free ammonia liquor formed therefrom, drawing off a portion of the liquor containing the fixed ammonia and mixing it with the liquor formed by scrubbing the gas with fresh water and free ammonia liquor formed therefrom, cooling the mixture and washing the gas therewith, and finally drawing off the resulting ammoniacal liquor to storage.

2. The process of recovering the ammonia content of coal gas which consists in drawing off the gas from the gas collecting main and washing and cooling it to effect condensation of its water content, returning the condensate so obtained to the main and spraying the gas therewith to form a fixed ammonia liquor and drawing off a portion of the liquor, mixing the liquors drawn off with liquor containing free ammonia formed in the final scrubbing of the gas, cooling the mixture and washing the gas therewith and finally scrubbing the gas with fresh water and free ammonia liquor formed therefrom to complete the removal of its free ammonia content.

3. The process of recovering the ammonia content of coal gas which consists in drawing off the gas from the gas collecting main and condensing water therefrom and continuously circulating the condensate and spraying the gas in the main therewith so as to effect concentration of the liquor in the main in fixed ammonia, continuously drawing off a quantity of the concentrated liquor so as to maintain a uniform quantity of water in the main and prevent it from becoming saturated with fixed ammonia, scrubbing the gas with fresh water and free ammonia liquor formed therefrom to effect final removal of the ammonia therefrom, adding to the liquor derived from such scrubbing the liquor withdrawn from the circulating system carrying the fixed ammonia, cooling the mixture and washing the gas therewith, and finally drawing off the resulting ammoniacal liquor to storage.

4. In an organization of apparatus for recovering the ammonia content of coal gas the combination of a collecting gas main and means for spraying the gas therein with water, a circulating system in which gas withdrawn from the main is cooled and its water content condensed and the condensate together with overflow water from the main is returned to the main to spray the gas therein, a scrubbing system in which the gas is scrubbed with fresh water and free ammonia liquor formed therefrom, means for drawing off water charged with fixed ammonia salts from the said circulating system and for mixing it with the liquor formed by scrubbing the gas with fresh water and free ammonia liquor formed therefrom in the scrubbing system and means for cooling the mixture and washing the gas therewith.

5. The process of recovering ammonia from coal gas which consists in first washing and cooling the gas with water condensate from the gas itself, finally scrubbing the gas with water and free ammonia liquor formed therefrom and intermediate these two operations cooling and mixing the liquors resulting from the first washing and the final scrubbing, bringing the gas in contact with the mixture and withdrawing the resulting ammoniacal liquor.

6. The process of recovering ammonia from coal gas which is characterized by effecting the final removal of ammonia from the gas by scrubbing the gas with water and free ammonia liquor formed therefrom and prior to such final scrubbing of the gas bringing the gas in contact with a cooled liquor containing the fixed ammonia liquor from the gas main and the weak ammonia liquor from the final scrubbing.

7. The process of recovering ammonia from coal gas characterized by cooling and continuously circulating in contact with the gas, ammoniacal liquor formed and maintained by adding fixed ammonia liquor from the gas main to weak ammonia liquor from the final ammonia scrubbers and continously drawing off circulated liquor as finished product after its contact with the gas.

8. The process of recovering ammonia from coal gas which comprises drawing off the gas from the gas main and cooling it so as to remove water vapor therefrom, spraying the gas in the main with this water condensate to cool the gas, remove tar and absorb fixed ammonia thereby producing a fixed ammonia liquor and prior to the final scrubbing of the gas with water to remove the last portions of ammonia, bringing the gas in contact with a cooled liquor containing the fixed ammonia liquor and the weak ammonia liquor from the final scrubbing.

9. The process of recovering ammonia from coal gas which comprises drawing off the gas from the main, cooling it by continuously circulating in contact with it water condensed from the gas itself thereby removing tar and condensing water vapor therefrom, mixing the excess condensate with liquor from the main and spraying the gas in the main with the mixture whereby tar is removed and a fixed ammonia liquor is obtained, finally removing ammonia from the gas by scrubbing it with water and free ammonia liquor formed therefrom and, prior thereto, cooling the gas by bringing it in contact with cooled liquor from the main and the weak ammonia liquor from the final scrubbing and withdrawing from the system the resultant ammoniacal liquor.

In testimony whereof I affix my signature, this 6th day of November, 1922.

BATES TORREY, Jr.